United States Patent [19]

Yi et al.

[11] Patent Number: 5,411,219
[45] Date of Patent: May 2, 1995

[54] VIDEOTAPE CASSETTE CASE

[75] Inventors: Gil-Goo Yi; Jun-Tae Kwon; Duk-Kyoon Yoon, all of Chungcheongnam-Do, Rep. of Korea

[73] Assignee: SKC Limited, Suwon, Rep. of Korea

[21] Appl. No.: 101,444

[22] Filed: Aug. 2, 1993

[30] Foreign Application Priority Data

Aug. 3, 1992 [KR] Rep. of Korea .................... 92-14499

[51] Int. Cl.[6] ........................................... G11B 23/087
[52] U.S. Cl. .................................................. 242/347
[58] Field of Search .............. 242/197, 198, 199, 341, 242/347; 360/132

[56] References Cited

U.S. PATENT DOCUMENTS 4,831,482  5/1989  Sato ............................ 242/199
5,201,476  4/1993  Gelardi et al. ............... 242/199

Primary Examiner—Daniel P. Stodola
Assistant Examiner—John P. Darling
Attorney, Agent, or Firm—William F. Pinsak

[57] ABSTRACT

A videotape cassette case has a plurality of miniaturized ribs, effectively replacing the prior art guide ribs of complicated structure, to thereby attain the advantages of lowering the manufacturing cost and increasing the cooling efficiency during the injection moulding thereof.

2 Claims, 3 Drawing Sheets

1

VIDEOTAPE CASSETTE CASE

FIELD OF THE INVENTION

The present invention relates to a videotape cassette case; and, more particularly, to an improved cassette case having a simplified structure and reduced weight and capable of increasing the cooling efficiency during the injection moulding thereof.

DESCRIPTION OF THE PRIOR ART

The conventional video tape cassette includes a case or housing having an upper and a lower sections which are engaged with each other by a plurality of bosses. The lower section has a pair of holes through which a pair of tape reels are rotatably located; and a number of guide ribs, which are formed at each corner of the upper and the lower sections, serve to guide the rotational movement of the tape reels. Further, the boss members have reinforcing ribs which are integrated with the guide ribs and the sidewalls of the case. However, such reinforcement ribs and guide ribs, due to their excessive size and complicated structure, often create difficulties for manufacturing the steel mould, tend to reduce the cooling efficiency during the injection moulding thereof and also entail additional manufacturing cost.

SUMMARY OF THE INVENTION

Accordingly, it is an object of the present invention to provide a videotape cassette case having a simplified structure and reduced weight by way of optimizing the design of the ribs necessary to fasten the upper and the lower sections and guide the tape reels.

It is another object of the present invention to provide a videotape cassette case capable of increasing the cooling efficiency during the injection moulding process by means of forming miniaturized ribs in the vicinity of the bosses and the tape reels.

It is a further object of the present invention to provide a videotape cassette case with drastically simplified configuration and structure which increases the manufacturing efficiency or lowers the manufacturing cost thereof.

The above and other objects of the present invention are accomplished through the inventive videotape cassette case including an upper and a lower sections, each of which has a bottom panel, a rear wall, a pair of sidewalls, wherein said cassette case is characterized in that: each wall of said upper and lower sections having a plurality of protruding ribs, the rear wall of each section having a shielding rib, the bottom panel of the upper section including a pair of first bosses each having a plurality of radially extending ribs and a first U-shaped rib, the bottom panel of the lower section including a second U-shaped rib mating with the first U-shaped rib and a pair of second bosses each having a T-shaped rib.

BRIEF DESCRIPTION OF THE DRAWINGS

The above and other objects, advantages and features of the present invention will be apparent from the following descriptions taken in conjunction with the accompanying drawings, wherein.

DETAILED DESCRIPTION OF THE PREFERRED EMBODIMENTS

Figure 1:
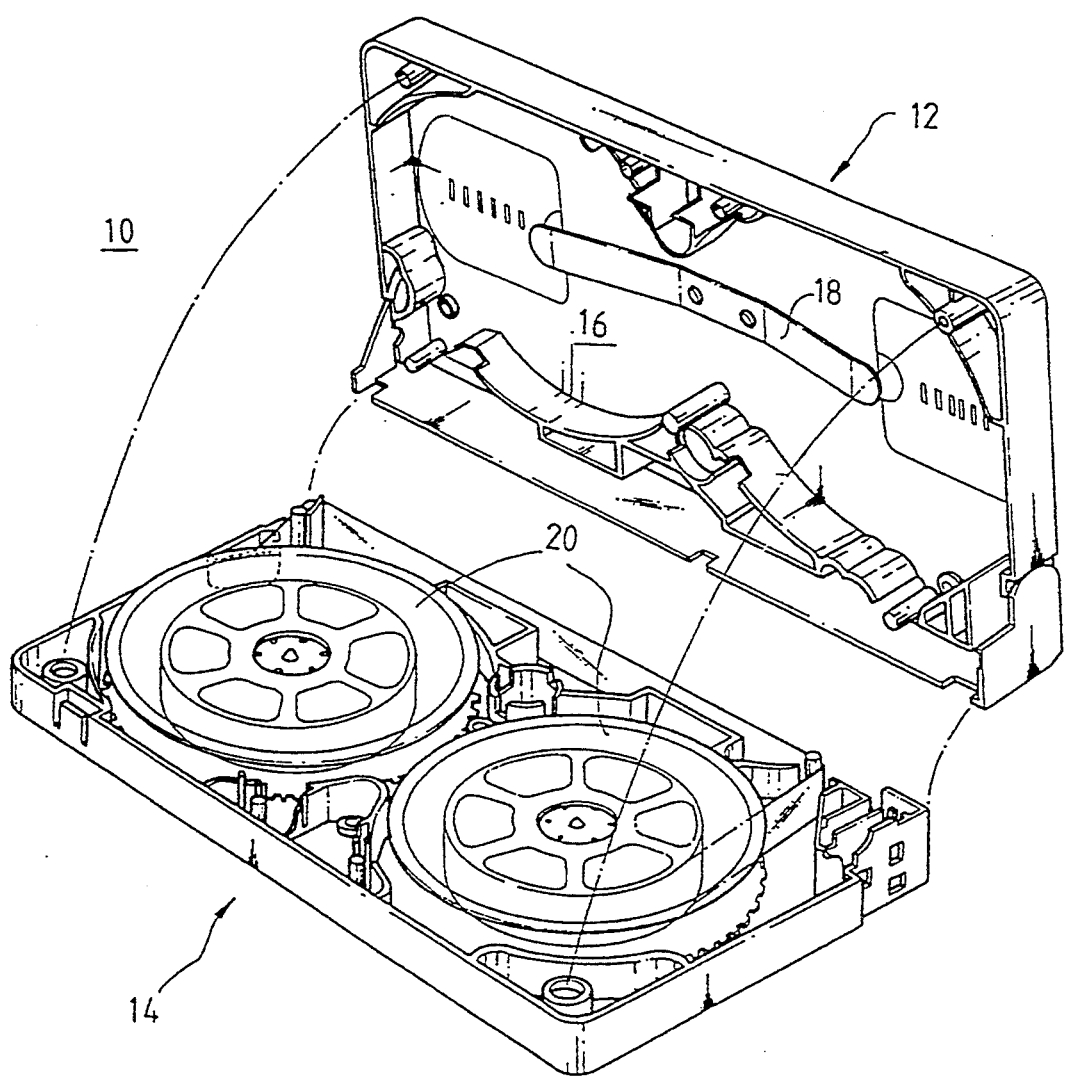
FIG. 1 is a perspective view of a videotape cassette of the prior art, with the upper and the lower sections of the cassette case being exploded.

Referring now to FIG. 1, there is shown a perspective view of a videotape cassette 10 of the prior art. As shown, the videotape cassette 10 includes an upper section 12 and lower section 14 having a bottom panel 16, 24 and peripheral walls projecting upwardly from the periphery of the bottom panel, respectively. A reel spring 18 is fixed to a center portion of the bottom panel 16 of the upper section 12, and a pair of tape reels 20 are located into a pair of holes 22 of the bottom panel 24 of the lower section 14 (see FIG. 3).

Figure 2:
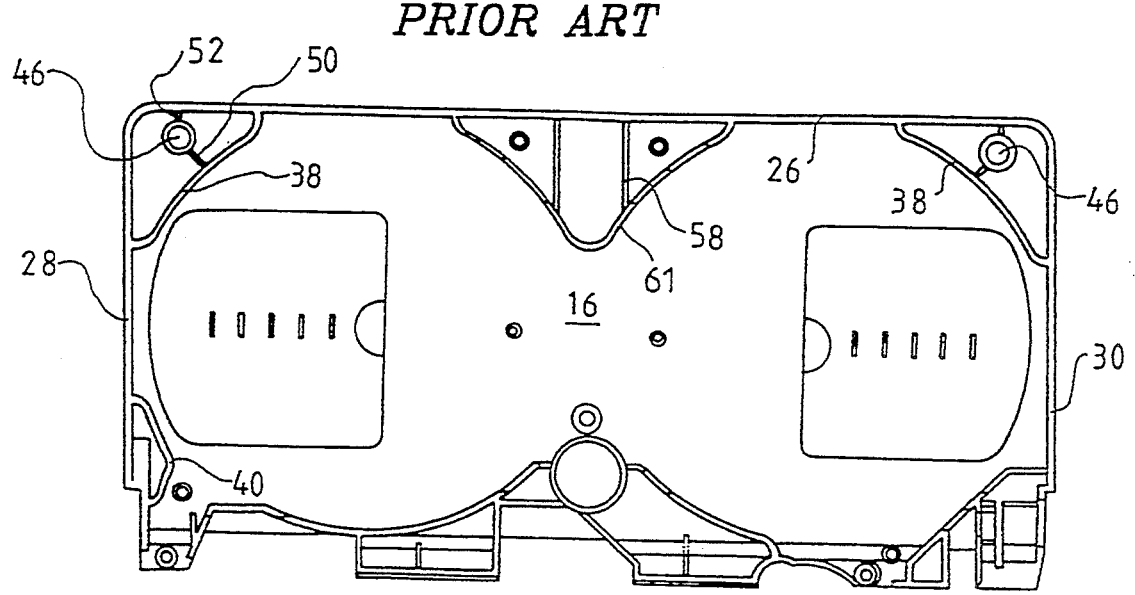
FIG. 2 is a plan view of the upper section of the cassette case shown in FIG. 1, with a reel spring removed.
Figure 3:
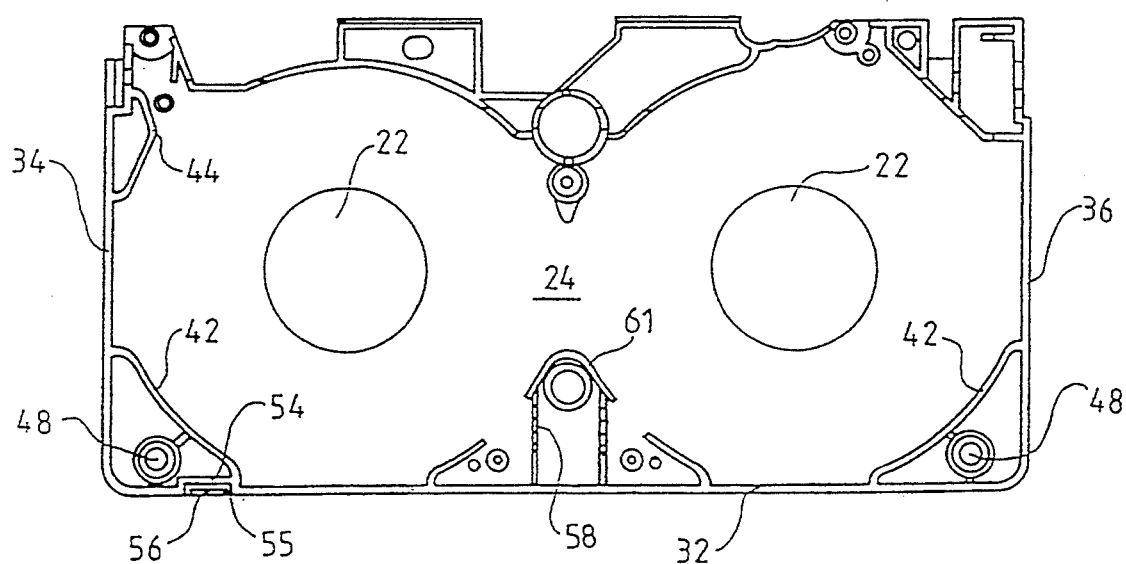
FIG. 3 is a plan view of the lower section of the cassette case shown in FIG. 1, with a pair of tape reels removed.

FIGS. 2 and 3 illustrate plan views of the upper and the lower sections of the cassette case of the prior art. The upper section 12 in FIG. 2 is illustrated upside down. As shown, the peripheral walls of each of the upper and the lower sections 12 and 14 consist of a rear wall 26, 32, a left and a right sidewalls 28, 34 and 30, 36, each of which is extended to be contiguous with one another. Formed in the vicinity of the intersection of the rear wall and the sidewalls are guide ribs 38, 42 that serve to guide the tape reels, and the opposite ends of the guide ribs are flushed with the rear wall 26, 32 and the sidewalls 28, 34 and 30, 36. A pair of first and a pair of second bosses 46 and 48 are positioned behind the side walls 28, 34 and 30, 36 and have reinforcing ribs 50 and 52 which are extended to the guide ribs and the rear wall. One end of the rear wall 32 of the lower section has an anti-recording opening 55 which is surrounded by a shielding rib 54; and a removable tab 56 is formed in front of the anti-recording opening (see FIG. 3). Formed at the center of the rear wall 32 is a pair of reinforcement ribs 58 for accommodating a release lever (not shown) that serves to release or lock the tape reels. Generally arcuate guide ribs 40, 44 are also formed at the left sidewalls 28, 34 to guide the tape reel.

Figure 4:
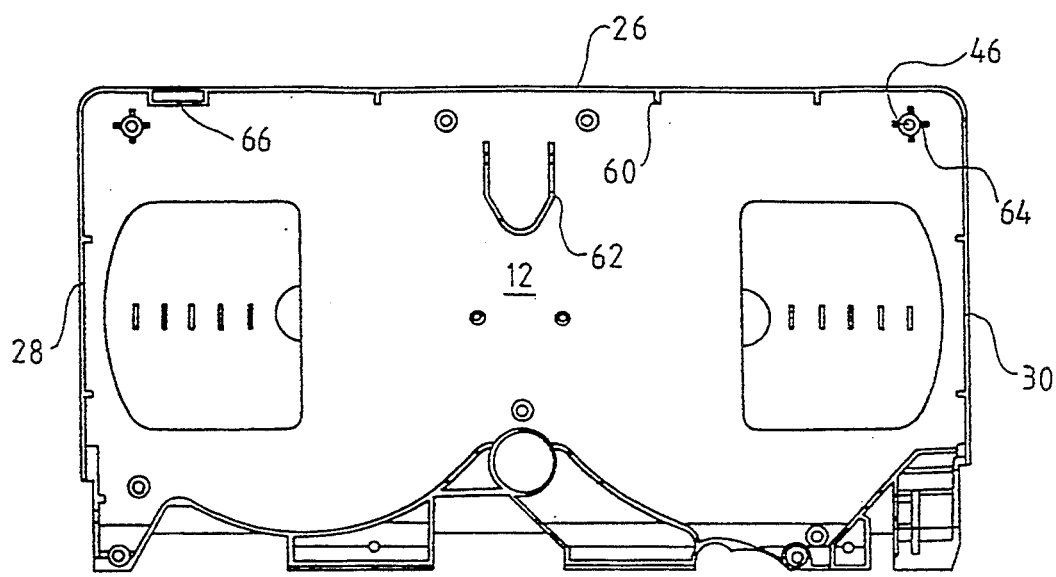
FIG. 4 is a plan view of the upper section of the cassette case in accordance with the present invention.

Referring to FIG. 4, there is shown a plan view of the upper section 12 of the cassette case in accordance with the present invention. As can be really ascertained from a comparison with the prior art structure shown in FIG. 2, the present invention drastically simplifies the wall-type reinforcement ribs 38, 42, 40, 44 with "protrusion-type" ribs 60 which protrude from the rear wall 26 and the sidewalls 28 and 30. The release lever locating rib 61 is also simplified into a U-shaped rib 62 by eliminating the surplus rib portion. Each of the first bosses 46 has a plurality of radially outward extending ribs 64 to effectively replace the reinforcement ribs 50, 52. More significantly, the guide ribs 38 in the vicinity of the first bosses are eliminated. A novel rib 66 formed at one end of the rear wall 26 serves as a shielding rib which is adapted to mate with the shielding rib 54 of the lower section(see FIG. 5) to prevent contaminants from entering into the cassette case, which shielding function used to be performed by the guide ribs 38, together with their lower section counterparts 42, in the prior art device.

Figure 5:
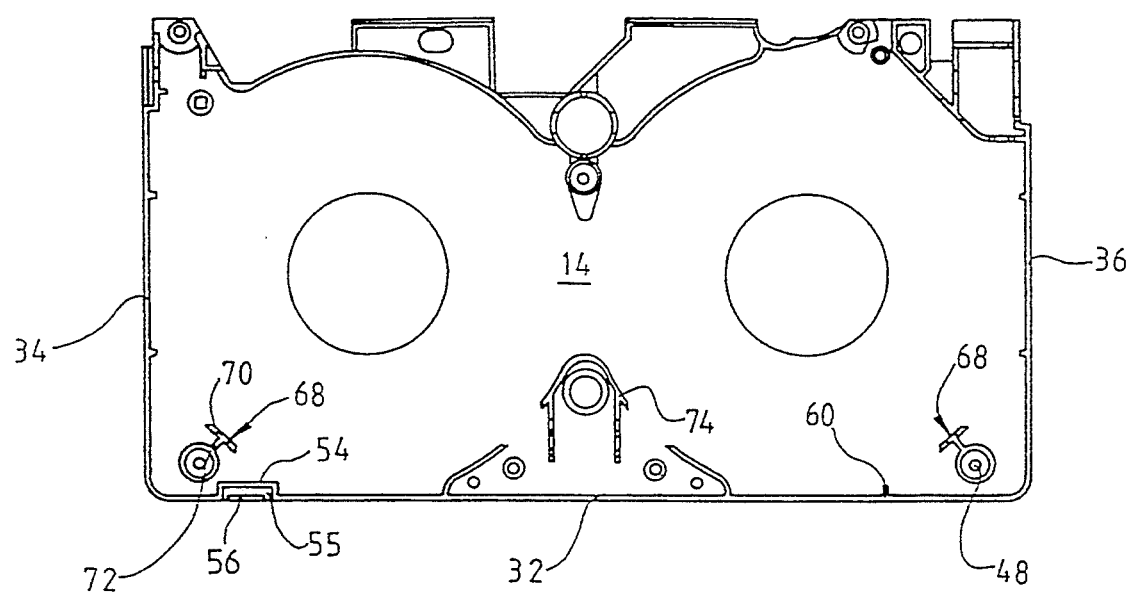
FIG. 5 is a plan view of the lower section of the cassette case in accordance with the present invention.

Turning now to FIG. 5, there is shown a plan view of the lower section 14 of the cassette case in accordance with the present invention. As shown, the rear wall 32 and the side walls 34 and 36 of the lower section 14 also have a plurality of protrusion-type ribs 60, and each of the second bosses 48 has a T-shaped rib 68, respectively. The T-shaped rib 68 includes a guide portion 70 for guiding the tape reels, and a reinforcing portion 72 extending between the second boss 48 and the guide portion 70. The guide portion 70 preferably has a trapezoidal form, i.e., its bottom length being greater than its top length. The release lever locating rib 74 is also cut out at the contact region with the rear wall.

Although the invention has been shown and described with respect to the exemplary embodiments, it should be understood by those skilled in the art that various changes, modifications and omissions may be made without departing from the spirit and scope of the invention defined by the claims that follow.

What is claimed is:

1. A videotape cassette case including an upper and a lower sections, each of which has a bottom panel, a rear wall, a pair of sidewalls, wherein said cassette case is characterized in that:

each wall of said upper and lower sections including a plurality of protruding ribs, each of said rear walls including a shielding rib, the bottom panel of the upper section including a first U-shaped rib and a pair of first bosses having a plurality of radially extending ribs, the bottom panel of the lower section including a second U-shaped rib mating with the first U-shaped rib and a pair of second bosses, each having a T-shaped rib, each of which has a guide portion for guiding a tape reel, and a reinforcing portion extended between the second boss and the guide portion.

2. The cassette case as claimed in claim 1, wherein the guide portion is of a trapezoidal form.

* * * * *